Figure 1:
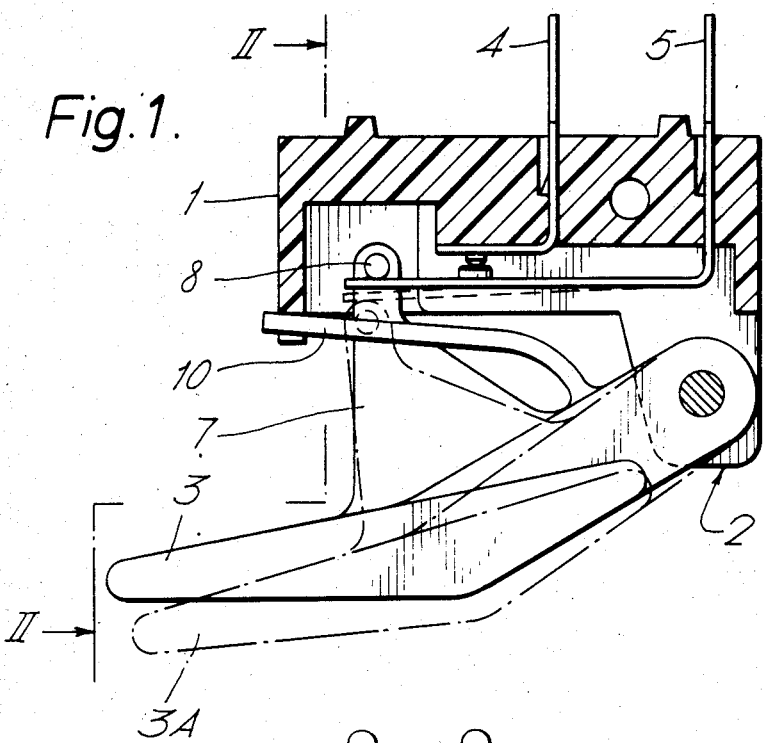

United States Patent [19]

Baines

[11] Patent Number: 4,692,940
[45] Date of Patent: Sep. 8, 1987

[54] TELEPHONE HOOK SWITCH
[75] Inventor: Peter J. Baines, Colchester, England
[73] Assignee: Standard Telephones and Cables Public Limited Company, London, England
[21] Appl. No.: 711,821
[22] Filed: Mar. 14, 1985
[30] Foreign Application Priority Data
Mar. 17, 1984 [GB] United Kingdom ............... 8407019
[51] Int. Cl.⁴ ............................................ H04M 1/08
[52] U.S. Cl. ..................................... 379/424; 379/429
[58] Field of Search ................................ 179/164, 159
[56] References Cited
U.S. PATENT DOCUMENTS
3,916,119 10/1975 Gumb et al. ....................... 379/426
4,517,419 5/1985 Kosten ................................ 379/424

Primary Examiner—Thomas W. Brown
Attorney, Agent, or Firm—Dennis P. Clarke

[57] ABSTRACT

A telephone hook switch arrangement includes a base assembly (1) and a T-shaped hook switch lever 3, which is substantially T-shaped. One end of the cross-piece of the T is pivoted to a downwardly-extending portion (2) of the base assembly. At the upper end of the leg of the T, pins (e.g. 8) are on each side, each fits under the end of a moveable contact (e.g. 5). The lever also has a spring strip 10 integral with it and normally under tension. The drawing shows the arrangement when off-hook, in which case the spring strip (10) urges the arrangement to the condition shown. When on-hook, the handset, via another linkage (not shown) urges the lever (3) to the state shown in dashed lines, when the contacts are open.

2 Claims, 3 Drawing Figures

TELEPHONE HOOK SWITCH

This invention relates to a hook-switch arrangement for use in a telephone.

According to the invention, there is provided a hook switch arrangement for a telephone, which includes a hook-switch lever pivotally mounted on a base assembly on which the hook switch contacts are mounted, wherein the hook switch lever is substantially T-shaped in side view, with one end of the cross-piece of the T pivotally mounted on support means on the base assembly, wherein when the arrangement is in use in a telephone the handset of that telephone depresses the other end of the cross-piece of the T, wherein the leg of the T carries a pin or the like which is adjacent to one of the hook switch contacts, wherein a spring strip integral with the cross-piece of the T is attached thereto near one end and extends across the leg of the T, which spring strip engages a fixed portion of the base assembly, and wherein when the handset is off-hooked the lever rotates about its pivot against the urgence of said spring strip, which rotation causes the pin or the like on the leg of the T to separate the hook switch contacts.

Figure 2:
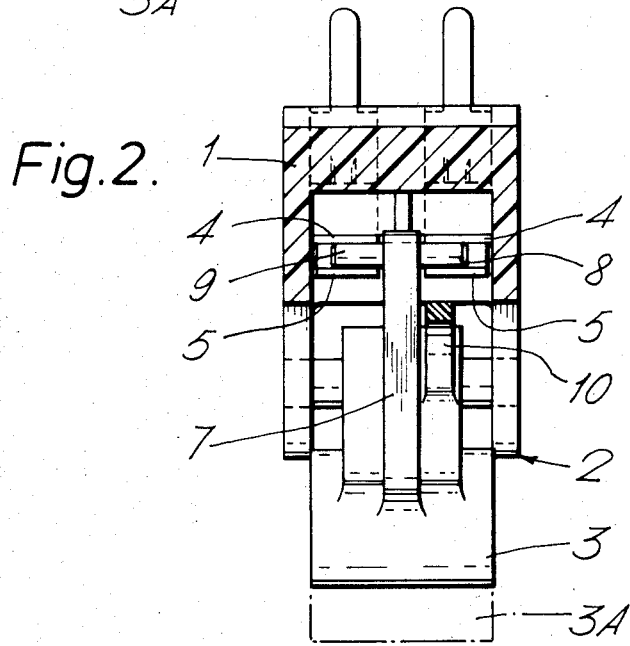
Figure 3:
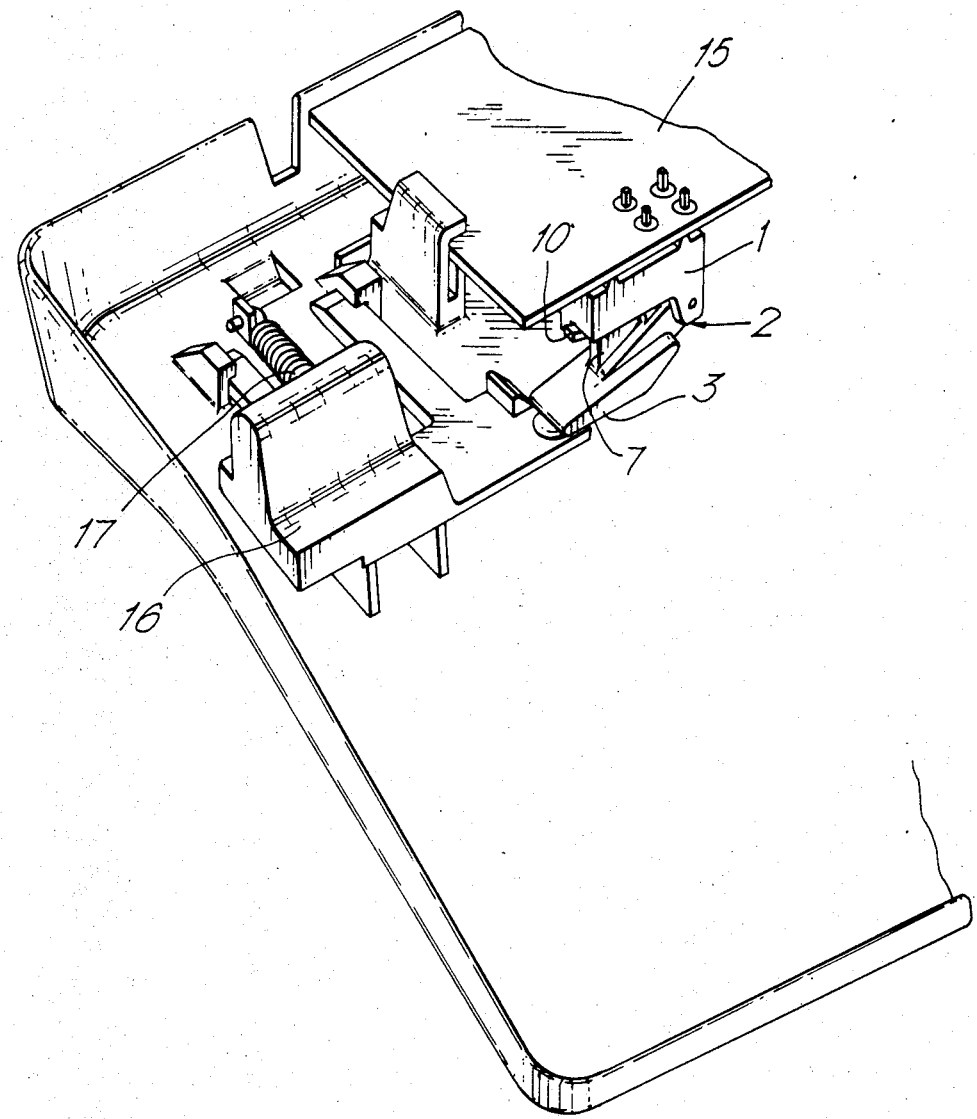

An embodiment of the invention will now be described with reference to the accompanying drawing, in which FIG. 1 is a view, partly sectioned, of a hook switch arrangement embodying the invention, FIG. 2 is a view, also partly sectioned, of the arrangement of FIG. 1, taken along the line II—II, and FIG. 3 is a perspective view from above of a telephone set with cover removed to show how the arrangement of FIGS. 1 and 2 fits into the set.

The hook switch arrangement has a base assembly 1, with a downwardly extending portion 2 at its right-hand end. The hook switch lever 3 has a bifurcated right-hand end, the two portions of which fit one on each side of the portion 2. A pivot pin, which may be internal with the portion 2 receives the end of the lever 3, which is substantially T-shaped.

The base assembly includes two pairs of contacts, one of which pairs can be seen in FIG. 1, where we see a stationary contact 4 and a movable contact 5. As can be seen, each of these contacts is bent through 90° to fit in a "tunnel" in the base assembly, in which it is held by a small tine on each contact, which co-operates with a shoulder in the tunnel.

The hook switch lever has at the upper end of its leg 7 pins 8 and 9, one extending on each of its sides, and which each co-operate with the movable contact of one of the two contact pairs. As can be seen, especially from FIG. 2, each of these pins is located above one of the movable contacts. The lever also has an integral spring strip 10 near the lever's pivot. As can be seen from FIG. 1, this spring strip has its free end received in a hole in another downwardly extending portion of the base assembly. Thus the spring strip is under tension when we have the condition shown in FIG. 1.

We now refer to FIG. 3, which shows how the arrangement of FIGS. 1 and 2 fits into a telephone set. Here we see the base assembly 1 fitted into the underside of a printed circuit board 15. The handset (not shown) when in position rests on a hook switch member 16 which is held in place by a coil spring 17.

With the handset on hook the member 16 is in the down position, so that the lever 3 is in the position shown in FIGS. 1 and 2 at 3A. In this case the contacts are open.

When the subscriber off-hooks, the member 16 moves upwards and outwards under the influence of the spring 17, as a result of which the lever 3 is rotated to the position shown in solid lines in FIGS. 1 and 2. Hence the hook switch contacts are then closed to give the usual off-hooking signal. This movement of the lever 3 is against the influence of the spring strip 10.

When the subscriber on-hooks at the end of the call, the member 16 returns to its rest position against the urgence of the spring 17, and the lever 3 rotates under the urgence of the spring strip to the position shown in broken lines at 3A, FIGS. 1 and 2, thus breaking the contacts.

I claim:

1. A telephone hook-switch arrangement, which includes a base assembly on which the hook-switch contacts are mounted, a hook-switch lever which is substantially T-shaped in side view, support means for the hook-switch lever on the base assembly, with one-end of the cross-piece of the T of said lever pivotally mounted on said support means, and a hook-switch member on the base assembly which in the on-hook condition is held non-operated by handset against the urgence of spring means, wherein when the telephone which includes the arrangement is in the on-hook condition the handset member depresses the other end of the cross-piece of the T, wherein a pin on the leg of the T is adjacent to one of the hook-switch contacts, wherein there is a spring strip integral with the cross-piece, wherein said spring strip extends across the leg of the T and engages a fixed portion of the base assembly, and wherein when the handset is off-hooked the lever rotates about its pivot against the urgence of the spring means to close the hook-switch contacts via said pin, which rotation of the lever occurs under the influence of the spring means associted with the hook-switch member.

2. A hook switch arrangement as claimed in claim 1, wherein the hook switch contacts include two contact pairs one of which is closed before the other when a subscriber off-hooks.

* * * * *